(12) United States Patent
Smith et al.

(10) Patent No.: US 7,574,066 B2
(45) Date of Patent: Aug. 11, 2009

(54) METHOD FOR IMAGE COMPRESSION, RELATED SYSTEM AND COMPUTER PRODUCT THEREFOR

(75) Inventors: Stewart G. Smith, Edinburgh (GB); Arcangelo Ranieri Bruna, San Cataldo (IT); Filippo Vella, Casa Santa Erice (IT)

(73) Assignees: STMicroelectronics S.r.l., Agrate Brianza (MI) (IT); STMicroelectronics Ltd., Almondsbury, Bristol (GB)

( * ) Notice: Subject to any disclaimer, the term of this patent is extended or adjusted under 35 U.S.C. 154(b) by 695 days.

(21) Appl. No.: 11/219,621

(22) Filed: Sep. 2, 2005

(65) Prior Publication Data
US 2006/0104531 A1    May 18, 2006

(30) Foreign Application Priority Data
Sep. 3, 2004    (EP)    .................................. 04020969

(51) Int. Cl.
G06K 9/36    (2006.01)
(52) U.S. Cl. .................................................... 382/251
(58) Field of Classification Search ......... 382/232–233, 382/238–240, 244–251; 348/384.1, 387.1, 348/390.1, 394.1–395.1, 404.1, 424.2; 358/426.01–426.03, 358/426.06–426.07; 375/240, 240.02, 240.12, 375/240.18–240.2
See application file for complete search history.

(56) References Cited

U.S. PATENT DOCUMENTS

| | | | | |
|---|---|---|---|---|
| 6,839,467 B2 * | 1/2005 | Bruna et al. | ................ | 382/239 |
| 7,024,044 B2 * | 4/2006 | Bruna et al. | ................ | 382/239 |
| 7,116,832 B2 * | 10/2006 | Bruna et al. | ................ | 382/239 |
| 7,269,300 B2 * | 9/2007 | Braun et al. | ................ | 382/298 |

FOREIGN PATENT DOCUMENTS

| | | |
|---|---|---|
| EP | 0719052 | 6/1996 |
| EP | 1173025 | 1/2002 |
| WO | WO9302527 | 2/1993 |

OTHER PUBLICATIONS

"A Very Fast Algorithm for the JPEG Compression Factor Control", Bruna et al., Proceedings of the SPIE—The International Society for Optical Engineering SPIE-Int. Soc. Opt. Eng USA, vol. 4669, Jan. 23, 2002, pp. 297-303, XP002310566, ISSN: 0277-786X.

(Continued)

*Primary Examiner*—Jose L Couso
(74) *Attorney, Agent, or Firm*—Lisa K. Jorgenson; Allen, Dyer, Doppelt, Milbrath & Gilchrist, P.A.

(57) ABSTRACT

A method for image compression of a set of image data includes performing a quantization operation on the image data. The quantization operation may include controlling a compression factor by applying a scaled quantization level obtained by multiplying a first quantization level by a gain factor. The gain factor may be updated as a function of a bit per pixel value of a compressed image. The update operation may include an iterative procedure including at least one iteration step that provides for updating a current gain factor as a function of a previous gain used for performing a previous compression step and as a function of a ratio of the bit per pixel value of the compressed image at the previous compression step to a target bit per pixel value. The method may be used in Joint Photographic Experts Group (JPEG) image processing and digital still cameras.

26 Claims, 5 Drawing Sheets

OTHER PUBLICATIONS

"Rate-Constrained Picture-Adaptive Quantization for JPEG Baseline Coders", Wu et al., Statistical Signal and Array Processing, Minneapolis, Apr. 27-30, 1993, Proceedings of the International Conference on Acoustics, Speech, and Signal Processing (ICASSP), New York, IEEE, US, vol. 4, Apr. 27, 1993, pp. 389-392, XP010110884, ISBN: 0-7803-0946-4.

"JPEG Rate Control Algorithm for Multimedia", Bruna et al., 2004 IEEE Symposium on Consumer Electronics, Jun. 2004, ISSN: 0-7803-8527-6, pp. 114-117.

* cited by examiner

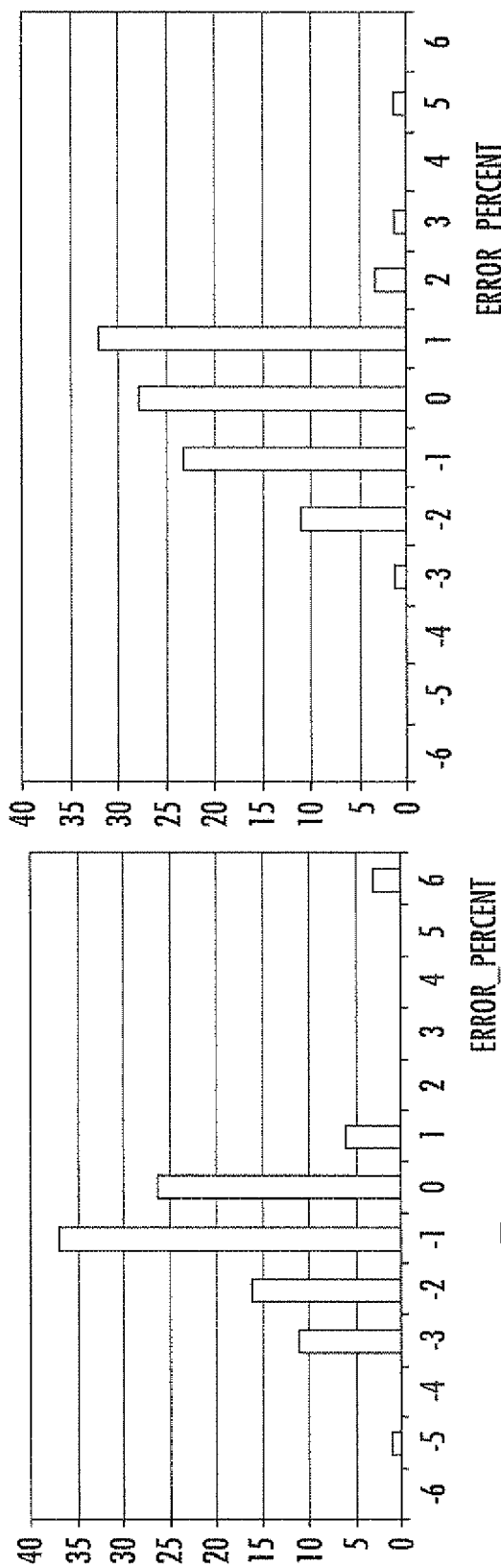
FIG. 7
FIG. 8
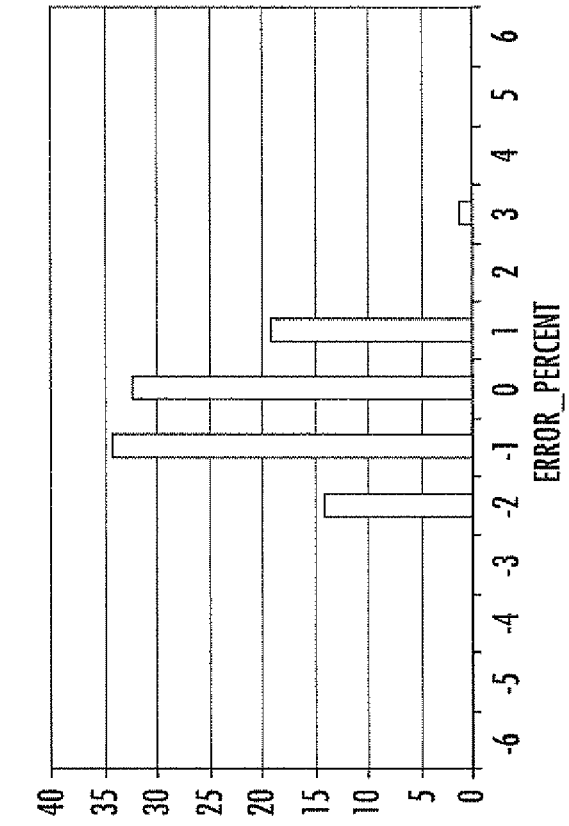
FIG. 9

METHOD FOR IMAGE COMPRESSION, RELATED SYSTEM AND COMPUTER PRODUCT THEREFOR

FIELD OF THE INVENTION

The present invention relates to techniques for image compression as may be applied in Joint Photographic Experts Group (JPEG) rate control procedures.

BACKGROUND OF THE INVENTION

Digital images are commonly used in several applications such as, for example, in digital still cameras (DSC). A digital image includes a matrix of elements, commonly referred to as a bit map. Each element of the matrix, which represents an elemental area of the image (a pixel or pel), is formed by several digital values indicating corresponding components of the pixel. Digital images are typically subjected to a compression process to increase the number of digital images which can be stored simultaneously, such as onto a memory of the camera. Moreover, this allows transmission of digital images to be easier and less time consuming. A compression method commonly used in standard applications is the JPEG (Joint Photographic Experts Group) algorithm, described in CCITT T.81, 1992.

In the JPEG algorithm, 8×8 pixel blocks are extracted from the digital image. Discrete Cosine Transform (DCT) coefficients are then calculated for the components of each block. The DCT coefficients are rounded off using corresponding quantization tables. The quantized DCT coefficients are encoded to obtain a compressed digital image (from which the corresponding original digital image can be extracted later on by a decompression process). In some applications, it may be desired to provide a substantially constant memory requirement for each compressed digital image. This problem may be particularly applicable in digital still cameras. In this case it may be ensured that a minimum number of compressed digital images can be stored onto the memory of the camera, to guarantee that a minimum number of photos can be taken by the camera.

The compression factor control, or rate control is quite difficult in algorithms, such as the JPEG, wherein the size of the compressed digital image depends on the content of the corresponding original digital image. Procedures for compression of JPEG images include adjusting a gain factor that multiplies the quantizers contained in quantization tables.

The object of the rate control procedures in particular is to find the value of the gain factor that allows creating a compressed image with a predefined output file size by controlling the bit per pixel (bpp) value.

The procedures for JPEG rate control can be divided in two categories: iterative and statistical. The iterative procedures adjust, by way of iterative steps, the value of the gain factor to achieve the desired bit per pixel value. At each step the resulting bit per pixel produced by the compression operation is compared with the desired bit per pixel value and the gain factor is modified accordingly. Statistical procedures evaluate the required gain factor G considering statistical relations between the target bit per pixel value and the gain factor.

Furthermore, JPEG rate control procedures can be classified by a constant precision or by a constant number of cycles. In the case of the constant precision procedures, the cycle is repeated until the bit rate is out of the predefined precision range. The advantage of constant precision procedures is that precision is always guaranteed, but neither time nor power consumption involved by the compression operation are predictable. On the contrary, in the case of a constant number of cycles, the precision that will be achieved is unpredictable, while time and power consumption are fixed and limited.

FIG. 1 shows a block diagram of a JPEG compression chain. In FIG. 1, the input image data, indicated with reference I, is fed to a Discrete Cosine Transform (DCT) block 10, and then to a Quantization block 20. The Quantization block 20 receives and uses a scaled quantization level $\tilde{Q}$ that is calculated as the product between a gain factor G and a Quantization level Q, according to the relation shown in Eq. 1.

$$\tilde{Q} = G \cdot Q \qquad \text{Eq. 1}$$

The Quantization level Q is selected in a Quantization Table 60. The quantized output from Quantization block 20 is then fed to a Zig-Zag Order block 30 and then to a Huffman Coding block 40. The Huffman Coding block 40 uses the output signal from Zig-Zag Order block 30 and a Huffman Table 50 to generate the JPEG Compressed Image O.

From EP-A-1 179 024; EP-A-1 173 036; EU-A-1, 179,026 and A. Bruna, M. Mancuso, "JPEG compression factor control: a new algorithm", ICCE International Conference on Consumer Electronics, 19-21 Jun. 2001, Page(s): 206-207, a procedure for JPEG rate control based on statistical properties of JPEG compression procedure is known. Such a procedure is based on a statistical relationship between the bit per pixel value (bpp) and gain factor. In particular, the considered relation is established between the gain factor and the bit per pixel value when the image is compressed with fixed quantization tables.

Such a procedure is a constant cycles procedure that includes just one cycle, but includes two phases: a first "retrieving" phase and a second "rate control" phase. The first "retrieving" phase is used to evaluate the parameters to solve the statistical model. The function that binds the gain factor to the bit per pixel value obtained by operating a compression of the images with a pre-set factor is approximated with a parabola or a quadratic relationship.

The main steps of such a procedure can be then summarized as follows:

calculating for all the images of the database a gain factor Gain* producing the target bit per pixel value (for example by way of a bisection algorithm);

choosing an intermediate value of gain factor Int_G for operating a first compression, considering the gain factor value producing the minimum spreading of the couples <bpp, Gain*> on the set of images of the database; and using a parabolic function to interpolate the gain factor Gain* versus the bit per pixel value bpp of the compressed image data obtained applying the value of gain factor Int_G, according to the following equation:

$$G = a \cdot bp^2 + b \cdot bp + c \qquad \text{Eq. 2}$$

where a, b, c indicate the coefficients of the parabolic function.

The retrieving phase outputs the value of gain factor Int_G for the first compression and the coefficients of the parabola (a, b, c). These values are put in relation with the database image, to the target bit per pixel and to Luminance-Bandwidth-Chrominance (YUV) sub-sampling parameters. When some of these parameters are changed the values for the changed settings must be retrieved. For the applications, i.e. in digital still cameras, all managed cases are considered previously and the related settings are retrieved.

FIG. 2 schematically illustrates the main steps performed in the rate control phase with the statistical procedure, that include:

compressing the image data I, using prescaled quantization tables according to the intermediate value of gain factor Int_G in a JPEG compressor block 70;

using the bit per pixel value bpp of the image outputted from JPEG compressor block 70 to estimate a gain factor defined as statistical gain Gs by way of the parabolic function shown in Eq. 2. In FIG. 2 such an estimation step is symbolized by a graph 80 that shows the relation between the gain factor Gain* calculated on the image database and bit per pixel value bpp; and using the estimated gain factor Gs for a final JPEG compression step similar to the compression step of block 70, but not shown in FIG. 2.

The topics considered in the foregoing form the subject of extensive technical literature, such as:

CCITT-Recommendation T.81: "information technology—Digital compression and coding of continuous tone still images"—Requirements and guidelines (1992);

"Sensors, cameras and applications for digital photography"—Proceedings of SPIE (Vol. 3650, January 1999);

Blaskaran, Konstantinides, "Image and video compression standards"—(pag. 86-93);

Nakagawa et al, "DCT-based still image compression ICS with Bit-Rate Control"—.—IEEE Trans. on Consumer Electronics, Vol. 38, No. 3, August 1992; and Wook Joong Lim et al., "A bit allocation method based on picture activity for still image coding"—IEEE Trans. on Image Proc., Vol. 8, No. 7, July 1999.

SUMMARY OF THE INVENTION

In view of the foregoing background, it is therefore an object of the present invention to provide an arrangement overcoming the drawbacks of the prior art, and proposing a method for image compression that allows for obtaining a better precision compared to the other methods with the same number of iterations.

According to the invention, these and other objects are achieved by a method for image compression of a set of image data. The method may include performing a quantization operation on the image data including controlling a compression factor by applying a scaled quantization level obtained by multiplying a first quantization level by a gain factor, with the gain factor being updated as a function of a bit per pixel value of a compressed image. The update operation may comprise at least one iteration step for obtaining the gain factor by updating a current gain factor as a function of a previous gain factor used for performing a previous compression step and as a function of a ratio of the bit per pixel value of the compressed image at the previous compression step to a target bit per pixel value.

The invention also relates to a corresponding system as well as to a related computer program product, loadable in the memory of at least one computer and including software code portions for performing the steps of the method of the invention when the product is run on a computer. As used herein, reference to such a computer program product is intended to be equivalent to reference to a computer-readable medium containing instructions for controlling a computer system to coordinate the performance of the method of the invention. Reference to "at least one computer" is evidently intended to highlight the possibility for the present invention to be implemented in a distributed/modular fashion.

In brief, the proposed method provides for putting together a statistical procedure, based on statistical properties of compressed JPEG images, with an iterative procedure. This ensemble of procedures allows having very accurate performance using, as a starting point for iterations, the value calculated with the statistical method. Accordingly, this allows for setting the parameters of JPEG compression so that the dimension of the output file will be as near as possible to a set of target dimensions.

BRIEF DESCRIPTION OF THE DRAWINGS

The invention will now be described, by way of example only, with reference to the enclosed figures of drawing, wherein:

FIG. 7 shows a histogram of the performance of a statistical procedure of the invention;

FIG. 8 shows a histogram of the performance of a general-purpose procedure with three iterations of the invention; and FIG. 9 shows a histogram of the performance of the method of the invention.

DETAILED DESCRIPTION OF THE PREFERRED EMBODIMENTS

The method for image compression described herein includes two different procedures, a first statistical procedure and a second iterative procedure, to improve the performance of the rate control procedures.

Figure 3:
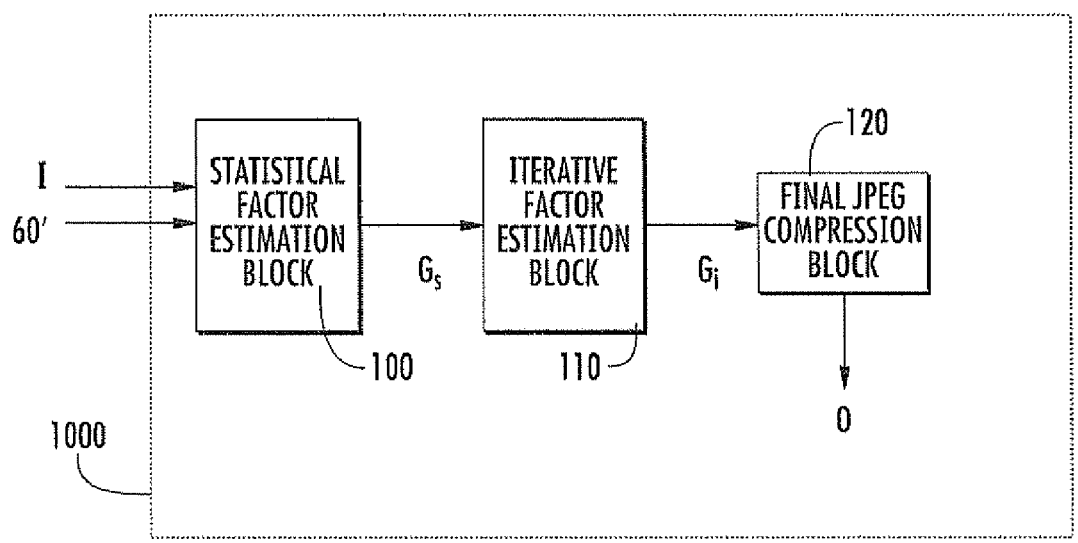
FIG. 3 shows a block diagram of the hybrid method compression chain according to the invention.

A block diagram, schematically illustrating the proposed method, or hybrid method, indicated as a whole with reference number 1000, is shown in FIG. 3. In FIG. 3, the JPEG image I is fed together with settings 60', such as bit rate and image size, to a first statistical factor estimation block 100, that performs a statistical procedure and produces as output a statistical gain Gs. The statistical factor estimation block 100 uses the settings 60' for prescaling the coefficients of the quantization tables. The statistical gain Gs is then fed to a subsequent iterative factor estimation block 110 that performs an iterative procedure producing an iterative gain Gi. A final JPEG compression operation is then executed in a block 120 using such an iterative gain Gi for scaling to obtain a compressed image O.

As will be apparent in the following from the detailed description of the procedures, in total three JPEG compression steps are use by the hybrid device 1000. Moreover, the iterative part can be iterated to obtain better precision.

The statistical procedure, performed in the statistical factor estimation block 100, corresponds substantially to that already described with reference to FIG. 2 and includes:

operating one time a JPEG compression on the image data I using a fixed intermediate gain value Int_G; and using the bit per pixel value produced by such a JPEG compression operation to estimate a new gain factor value, the statistical gain Gs, using the statistical relation according to Eq. 2.

The statistical procedure performed in block 100 uses one JPEG compression. The values of the intermediate gain value Int_G and the coefficients for Eq. 2 are retrieved for the previously defined image resolutions and the target bit per pixel.

The iterative procedure performed in the iterative factor estimation block 110 uses then the new bit per pixel value count produced by the last JPEG compression operation in block 100 to estimate the final gain value, the iterative Gain Gi, through an iteration formula, that will be better detailed in the following with reference to Eq. 6.

In general, iterative procedures search for the solution by adjusting parameters in relation to the results of the previous attempts. The value to be retrieved is a gain factor for scaling the quantization table so that the compressed JPEG image has the target bit per pixel value. The bit per pixel value is determined by the compression operation and so is correlated to the gain factor imposed for the compression operation. The bit per pixel of the compressed image and the target bit per pixel are used to evaluate a gain factor update operation.

In the proposed iterative procedure, specifically, the following parameters are defined to find the relation that links the target bit per pixel and the gain factor at a previous iteration:

a target file size T, in Kbytes;
a current file size F, in Kbytes;
a gain factor G and new gain factor G';
a quality Q calculated as 1/G. Accordingly a new quality Q' is 1/G';
a bit per pixel ratio R calculated as the ratio of the current file size F to target file size T (F/T), i.e. the ratio between the output bit per pixel and the target bit per pixel; and
an easiness E, i.e. the abstract compressibility of an image.
From a statistical point of view is thus:

$$Q = E \cdot F^{1,5} \text{ and} \qquad \text{Eq. 3}$$

$$\frac{Q}{E \cdot F^{1,5}} = \frac{Q'}{E \cdot T^{1,5}} \Rightarrow Q' = Q\frac{T^{1,5}}{F^{1,5}} \text{ and finally} \qquad \text{Eq. 4}$$

$$G' = \frac{1}{Q} = \frac{F^{1,5}}{Q \cdot T^{1,5}} = G \cdot R^{1,5} \qquad \text{Eq. 5}$$

By defining the new gain factor G' as a gain $G_{n+1}$ at a (n+1)-th iteration step, with n an integer, and the gain factor G as a gain $G_n$ at a n-th iteration step, the function proposed to link bit per pixel, target bit per pixel and previous gain factor is:

$$G_{n+1} = G_n * R_n^{1,5} \qquad \text{Eq. 6}$$

where $R_n$ indicates the bit per pixel ratio at the n-th iteration step, obtained as ratio between the output bit per pixel at the n-th iteration step, i.e. the bit per pixel value of the image compressed with the previous gain factor $G_n$, and the target bit per pixel value T.

Figure 4:
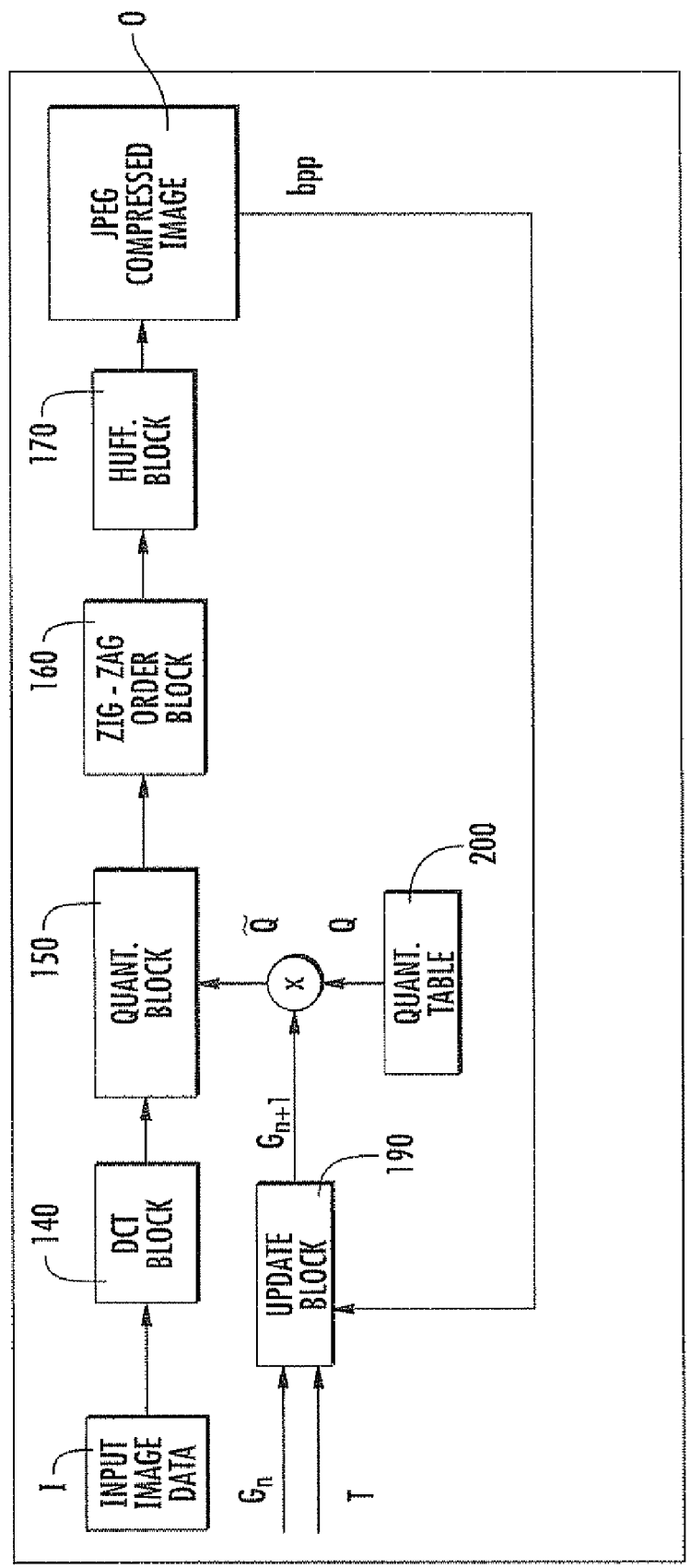
FIG. 4 shows a block diagram of the JPEG compression chain including an iterative factor estimation procedure according to the invention.

FIG. 4 shows a block diagram of compression chain including the Iterative Factor Estimation procedure just described. The input data image I is fed to a Discrete Cosine Transform block 140, and then to a Quantization block 150. The Quantization block 150 receives and uses the scaled quantization level $\tilde{Q}$ that is calculated as the product between the value of the new gain factor $G_{n+1}$ and the Quantization level Q. The Quantization level Q is selected in a Quantization Table 200. The quantized output from block 150 is fed to a Zig-Zag Order block 160 and then to a Huffman Coding block 170. The Huffman Coding block 170 uses the output signal from Zig-Zag Order block 160 to generate the JPEG Compressed Image O. From this JPEG Compressed Image O it is possible to extract the associated output bit per pixel value bpp. Such an output bit per pixel value bpp is fed back to a Gain Update block 190 for evaluating the ratio $R_n$ at the n-th step and applying the iterative relation according to Eq. 6 on the gain factor $G_n$ at the n-th step and the target bit per pixel T, in order to calculate the new value of gain factor $G_{n+1}$ for the next step n+1. Due to the computational cost, the Eq. 6 in the Gain Update block 190 is preferentially approximated with the following linearization:

$$G = G * R * (R+1)/2 \qquad \text{Eq. 7}$$

The iterative procedure here described is not related to a specific resolution or specific target bit per pixel value or Luminance-Bandwidth-Chrominance (YUV) sub-sampling, so it can be applied to a generic image without the need of operating on pre-fixed cases, e.g. images coming from a pre-determined sensor where a-priori information is known.

A starting value G1 of the gain factor for the iteration can be chosen as:

$$G1 = 3 * (\text{Initialbpp}/T)/32 \qquad \text{Eq. 8}$$

where Initialbpp is the number of bit per pixel of the image I.

While the statistic procedure begins with a value of G that depends on the settings (TargetBpp, image size), eq. 8 is used when the iterative procedure is used without the statistic procedure.

Making use of the iterative procedure just described it is possible then to define a general method for JPEG rate control, merging the iterative procedure and the statistical procedure according to the scheme already illustrated in general with reference to FIG. 3, that is particularly suitable for increasing precision in some predefined cases, i.e. the images coming from a sensor, with predefined image size/bit per pixel requirements.

The statistical procedure in the proposed method needs to know the values of the intermediate gain Int_G and of the parabola parameters (a, b, c) for setting its one compression. For this reason a previous phase is needed to create the adequate model. So the method described herein knows the image resolutions and the target bit per pixel that will be used in the compression phase.

On the other side the iterative procedure, considered as standing alone, has general purpose and can be performed without any previous setting. On the basis of these considerations a general-purpose JPEG rate control procedure for all resolutions and for all target bit per pixel is also proposed having performances that are related to the procedure used.

Thus, if the target bit per pixel, resolution of image to be compressed, and Luminance-Chrominance (YUV) sub-sampling are in the set of parameters considered in the retrieval phase of the statistical factor estimation procedure then the hybrid method 1000 of FIG. 3 is used. In this case precision is very high and advantages of both types of procedures are exploited.

Otherwise, if the values of target bit per pixel, the resolution of image to be compressed and the Luminance-Chrominance (YUV) sub-sampling are outside of the considered set, only a simple iterative factor estimation procedure is used applying the general purpose Eq. 6 or its approximation given by the Eq. 7 and starting from the gain factor value G given by Eq. 8. Precision for this method using only iteration is good although it is worse than the precision given by the hybrid statistical-iterative solution with the same number of iterations.

Figure 5:
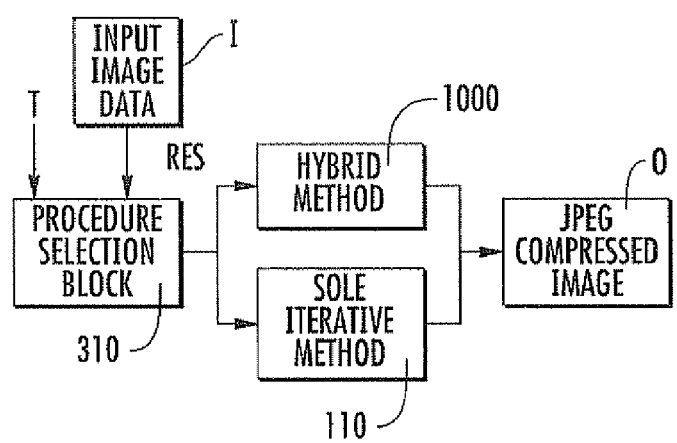
FIG. 5 shows a block diagram of a general purpose JPEG rate control procedure according to the invention.

FIG. 5 schematically illustrates such a general-purpose JPEG rate control procedure. The input image data I is fed to a Procedure Selection block 310 with image resolution RES and target bit per pixel value T. Two different ways to obtain the output Compressed JPEG Image O are possible on the basis of the selection performed by block 310. The hybrid method 1000 comprising the statistical procedure 100 and the iterative procedure 110, that is presented in general with reference to FIG. 3 or the sole iterative procedure 110 based on Eq. 6 or Eq. 7. The number of iterations used to estimate the iterative gain factor Gi can be increased to have a better precision in the output bit per pixel.

Figure 6:
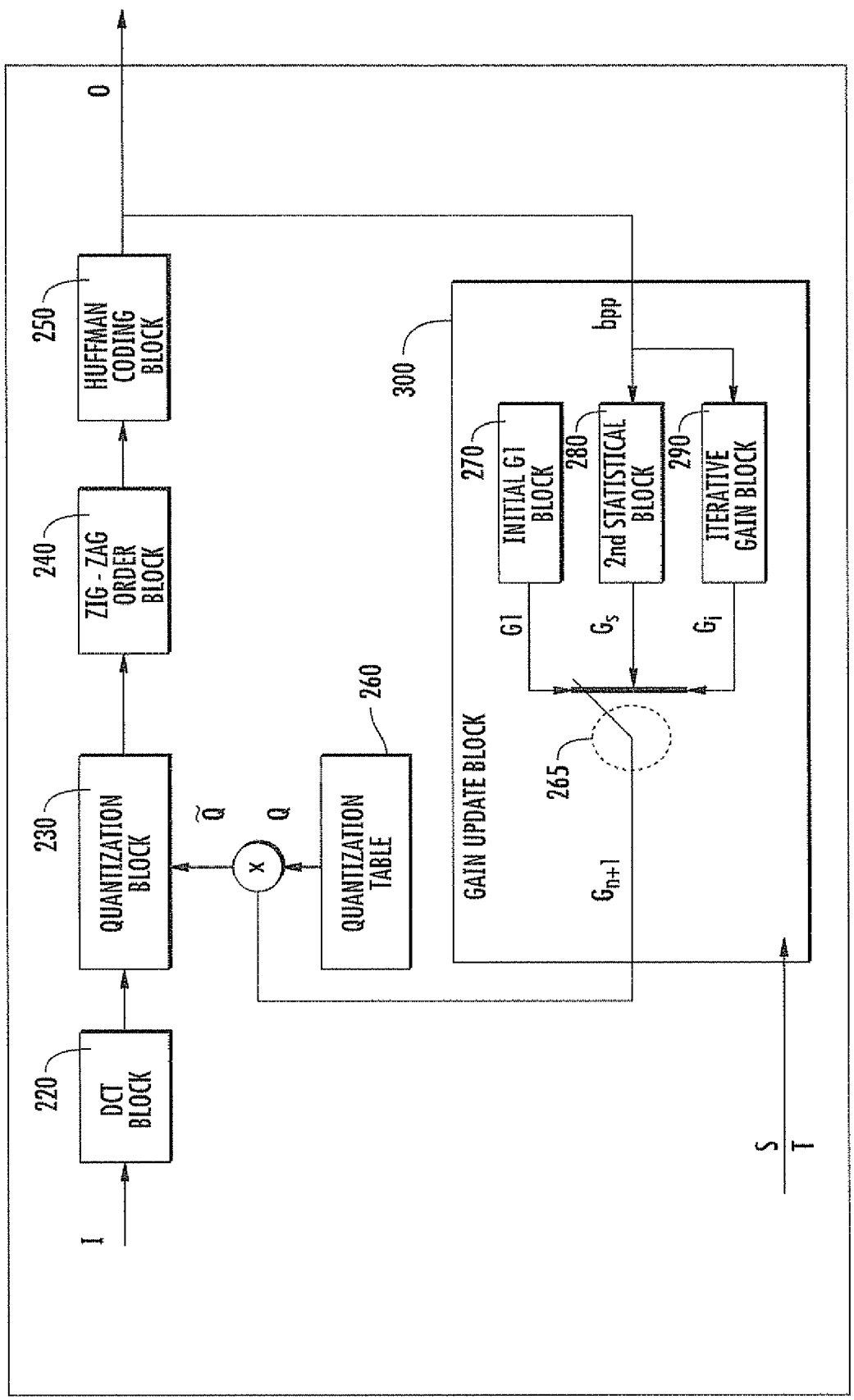
FIG. 6 shows a block diagram of the JPEG compression chain using the hybrid method of FIG. 3.

FIG. 6 shows a block diagram of a possible embodiment of the JPEG compression chain using the hybrid method 1000 involving both the statistical procedure and the iterative procedure. In particular, the image data I is fed to a Discrete Cosine Transform block 220, and then to a Quantization block 230. The Quantization block 230 receives and uses the scaled quantization level $\tilde{Q}$ that is calculated as the product between the value of the updated gain factor $G_{n+1}$ and the Quantization level Q. The Quantization level Q is selected in a Quantization Table 260. The quantized output from the Quantization block 230 is fed to a Zig-Zag Order block 240 and then to a Huffman Coding block 250. The Huffman Coding block 250 uses the output signal from Zig-Zag Order block 240 to generate the JPEG Compressed Image O. From this JPEG Compressed Image O it is possible to extract the output bit per pixel value bpp. This value bpp is fed back to a Gain Update block 300.

Figure 1:
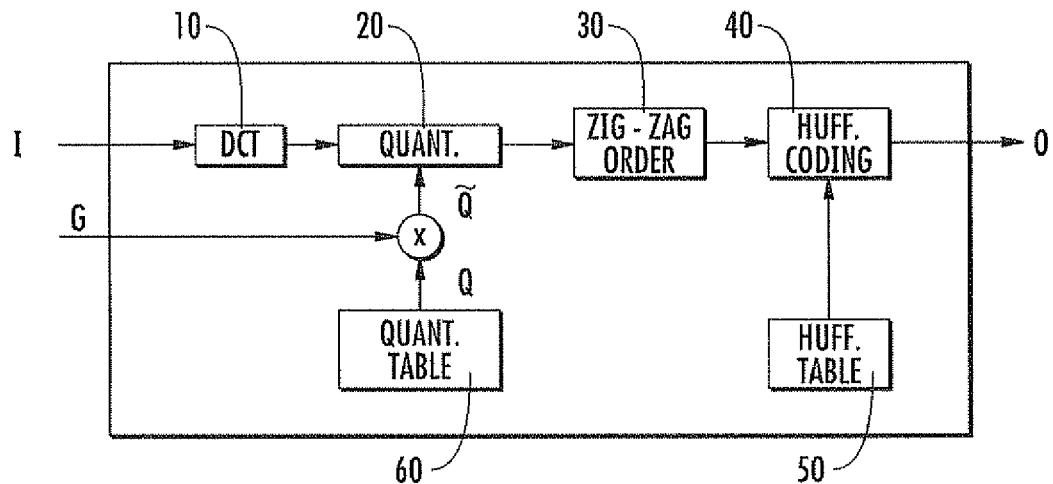
FIG. 1 and FIG. 2 are schematic block diagrams of a compression chain according to the prior art.
Figure 2:
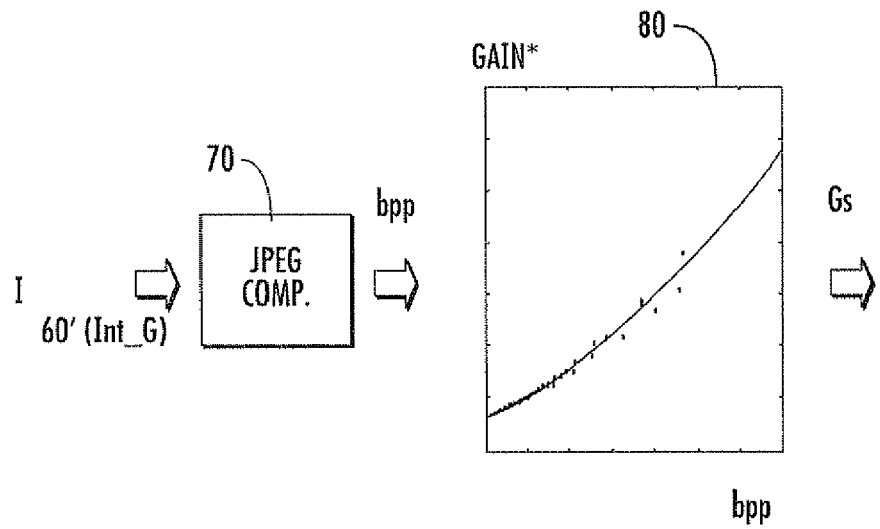

Block 300 comprises an Initial G1 block 270 for introducing the starting value G1 of the gain factor according to the value obtained statistically from the target bpp and the file size if the hybrid algorithm is used, or according to the Eq. 8 if the sole iterative algorithm is used, a second Statistical block 280 performing the statistical procedure 100 of FIG. 2, and a third Iterative block 290, performing the proposed iterative procedure 110. Block 300 selects one sub-block at each time using a switch 265. The first time the block 300 selects block 270, operating a compression with the starting value G1, the second time selects the statistical procedure 280 obtaining the statistical gain Gs and after that block 290 is selected to obtain the iterative gain Gi that yields the desired target bit per pixel value.

Block 300 works on an image size S and the target bit per pixel T information, and previous gain factor $G_n$, to calculate the updated value of gain factor $G_{n+1}$ for the next step. The advantage of the hybrid method presented here, is to achieve the best precision compared to the other methods with the same number of iterations.

If the parameters of input file are not included in the set of the statistical procedure, the hybrid method is not applied and the iterative procedure is performed. Precision is lower but the application field is formed by all the settings that are not contemplated in the Statistical Factor Evaluation set.

The number of the operations of the JPEG sub-blocks is shown in the following table 1. It refers to 8×8 pixels for both the luminance and the chrominance data in 4:2:2 sub sampled format (see Nakagawa et al. "DCT-based still image compression ICS with bit-rate control, IEEE 1992).

TABLE 1

|  | DCT | Quantization | ZigZag Order | Huffman | Total |
|---|---|---|---|---|---|
| LUT |  | 128 | 128 | 258 | 514 |
| Comparison |  |  | 128 |  | 128 |
| Shift |  |  |  | 130 | 130 |
| Sum | 1228 |  |  |  | 1228 |
| Multiplication | 1228 | 128 |  |  | 1356 |
| Logical op |  |  |  | 130 | 130 |

The cost of each iteration with the iterative procedure is shown in the following table 2.

TABLE 2

|  | Gain Gi iteration calculation |
|---|---|
| LUT |  |
| Comparison |  |
| Shift | 1 |
| Sum | 1 |
| Multiplication | 2 |
| Logical op |  |

On the other hand, the cost of the statistical gain Gs calculation in the "statistical" procedure is shown in the following table 3:

TABLE 3

|  | Gs iteration calculation |
|---|---|
| LUT |  |
| Comparison |  |
| Shift |  |
| Sum | 2 |
| Multiplication | 3 |
| Logical op |  |

The main contribution to computational complexity is given by the JPEG compression and so the principal factor to consider in the operation count is the number of iterations.

In FIGS. 7, 8, and 9 are shown the histograms of error distribution for some experiments done. The target bit per pixel is 3.2 and the resolution is QQVGA (Quarter Quarter VGA). A database of 110 images, captured with a CMOS-VGA sensor on the "STV6500-E01" Evaluation Kit equipped with a "502 VGA sensor" (see "Colour Sensor Evaluation Kit VV6501" STMicroelectronics, Edinburgh 2003) has been used for testing.

A percentage error Error_percent is expressed as:

$$\text{Error\_percent} = \frac{\overline{bpp} - bpp}{\overline{bpp}} \cdot 100 \qquad \text{Eq. 9}$$

The horizontal axis shows the value of such percentage error Error_percent as defined in Eq. 9, while the vertical axis shows the percentage of images associated to each percentage error Error_percent value.

The statistical procedure shows good performance with two compression steps, one for compression with the intermediate value of gain Int_G and one with the final value of statistical gain factor Gs.

FIG. 8 shows the precision of the general-purpose iterative procedure when three iterations are accomplished. Globally, four compressions are needed because the final image compression is also taken in account. The precision of the hybrid method is presented also in the case where the number of iterations is equal.

With reference to FIG. 9, in this case one compression is needed for the statistical factor evaluation, one iteration is done with the iterative formula of iterative factor evaluation and a last compression is finally performed to have the compressed image with the final gain factor Gi.

Performance of the hybrid method is better than the performance of the known approaches also in the case that the number of iterations is the same.

Without prejudice to the underlying principles of the invention, the details and the embodiments may vary, also appreciably, with reference to what has been described by way of example only, without departing from the scope of the invention as defined by the annexed claims.

That which is claimed is:

1. A method for operating at least one processor and associated memory to perform image compression of a set of image data comprising:
    performing a quantization operation, within the processor, on the image data including controlling a compression factor by applying a scaled quantization level obtained by multiplying a first quantization level by a gain factor, with the gain factor being updated as a function of a bit per pixel value of a compressed image; and
    wherein the update operation comprises at least one iteration for obtaining the gain factor by updating a current gain factor as a function of a previous gain factor used for performing a previous compression step and as a function of a ratio of the bit per pixel value of the compressed image at the previous compression step to a target bit per pixel value.

2. The method according to claim 1 wherein the update operation further comprises a statistical procedure for estimating a statistical gain factor being supplied as an input parameter to the at least one iteration step.

3. The method according to claim 2 wherein the update operation further comprises performing a compression operation with a predefined gain factor.

4. The method according to claim 3 wherein the update operation comprises performing in a first step the compression operation, then in a second step the statistical procedure, and in a third step the at least one iterative procedure.

5. The method according to claim 2 further comprising selecting, on a basis of an image resolution and of the target bit per pixel value of the input image data, between a first update operation including the statistical procedure and the at least one iterative procedure and a second update operation including only the at least one iterative procedure.

6. The method of according to claim 3 wherein the statistical procedure comprises:
    compressing once the image data using an intermediate gain factor; and
    using the bit per pixel value produced by the compression operation to estimate a statistical gain factor using a parabolic function.

7. The method according to claim 1 wherein the at least one iteration provides for updating a current gain factor as a product of the previous gain factor with a cubic root of a square of the ratio of the output bit per pixel value of the compressed image at the previous compression step to the target bit per pixel value.

8. The method according to claim 7 wherein the product is approximated via a linearization of the cubic root of the square of the ratio.

9. The method according to claim 1 wherein the at least one iterative procedure is performed with a predefined gain as initial input parameter, and wherein the predefined gain is chosen as a function of a ratio of the bit per pixel value and of the target bit per pixel value of the input image data.

10. The method according to claim 3 wherein the compression comprises a Joint Photographic Experts Group (JPEG) compression.

11. A system including at least one processor and an associated memory for image compression of a set of image data comprising:
    a quantization module, located in the memory, for performing a quantization operation on the image data including controlling a compression factor by applying a scaled quantization level obtained by multiplying a first quantization level by a gain factor; and
    an updating module connected to said quantization module and including a iterative module for performing at least one iteration step for obtaining the gain factor by updating a current gain factor as a function of a previous gain factor used for performing a previous compression step and as a function of a ratio of the bit per pixel value of the compressed image at the previous compression step to a target bit per pixel value.

12. The system according to claim 11 wherein said updating module comprises a statistical module for performing a statistical procedure estimating a statistical gain factor and supplying the statistical gain factor as an input parameter to said iterative module.

13. The system according to claim 12 wherein said updating module comprises a compression module for performing a compression operation with a predefined gain factor.

14. The system according to claim 13 wherein said updating module comprises a switcher for switching in a succession said compression module, said statistical module, and said iterative module.

15. The system according to claim 12 further comprising a selection module for selecting on a basis of an image resolution and of the target bit per pixel value of the input image data between a first update path including said statistical module for performing the statistical procedure and said iterative module for performing the at least one iterative procedure and a second update path including said iterative module for performing only one iterative procedure.

16. The system according to claim 13 wherein said statistical module is for:
    compressing once the image data using an intermediate gain factor; and
    using the bit per pixel value produced by said compression module to estimate a statistical gain factor using a parabolic function.

17. The method according to claim 11 wherein said iterative module is for operating with a predefined gain as initial input parameter, the predefined gain being chosen as a function of a ratio of the bit per pixel value and of the target bit per pixel value of the input image data.

18. The system according to claim 13 wherein said compression module performs a Joint Photographic Experts Group (JPEG) compression.

19. A computer readable medium having computer-executable instructions for causing a processor to perform image compression of a set of image data comprising:
    computer-executable instructions for performing a quantization operation on the image data including controlling a compression factor by applying a scaled quantization level obtained by multiplying a first quantization level by a gain factor, with the gain factor being updated as a function of a bit per pixel value of a compressed image; and wherein the update operation comprises at least one iteration step for obtaining the gain factor by updating a current gain factor as a function of a previous gain factor used for performing a previous compression step and as a function of a ratio of the bit per pixel value of the compressed image at the previous compression step to a target bit per pixel value.

20. The computer readable medium according to claim 19 wherein the update operation further comprises a statistical procedure for estimating a statistical gain factor being supplied as an input parameter to the at least one iteration step.

21. The computer readable medium according to claim 20 wherein the update operation further comprises performing a compression operation with a predefined gain factor.

22. The computer readable medium according to claim 21 wherein the update operation comprises performing in a first step the compression operation, then in a second step the statistical procedure, and in a third step the at least one iterative procedure.

23. The computer readable medium according to claim 20 further comprising selecting, on a basis of an image resolution and of the target bit per pixel value of the input image data, between a first update operation including the statistical procedure and the at least one iterative procedure and a second update operation including only the at least one iterative procedure.

24. The computer readable medium of according to claim 21 wherein the statistical procedure comprises:

compressing once the image data using an intermediate gain factor; and using the bit per pixel value produced by the compression operation to estimate a statistical gain factor using a parabolic function.

25. The computer readable medium according to claim 19 wherein the at least one iterative procedure is performed with a predefined gain as initial input parameter, and wherein the predefined gain is chosen as a function of a ratio of the bit per pixel value and of the target bit per pixel value of the input image data.

26. The computer readable medium according to claim 21 wherein the compression comprises a Joint Photographic Experts Group (JPEG) compression.

* * * * *

UNITED STATES PATENT AND TRADEMARK OFFICE
CERTIFICATE OF CORRECTION

PATENT NO. : 7,574,066 B2
APPLICATION NO. : 11/219621
DATED : August 11, 2009
INVENTOR(S) : Smith et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 937 days.

Signed and Sealed this

Seventh Day of September, 2010

David J. Kappos
*Director of the United States Patent and Trademark Office*